Patented Feb. 27, 1923.

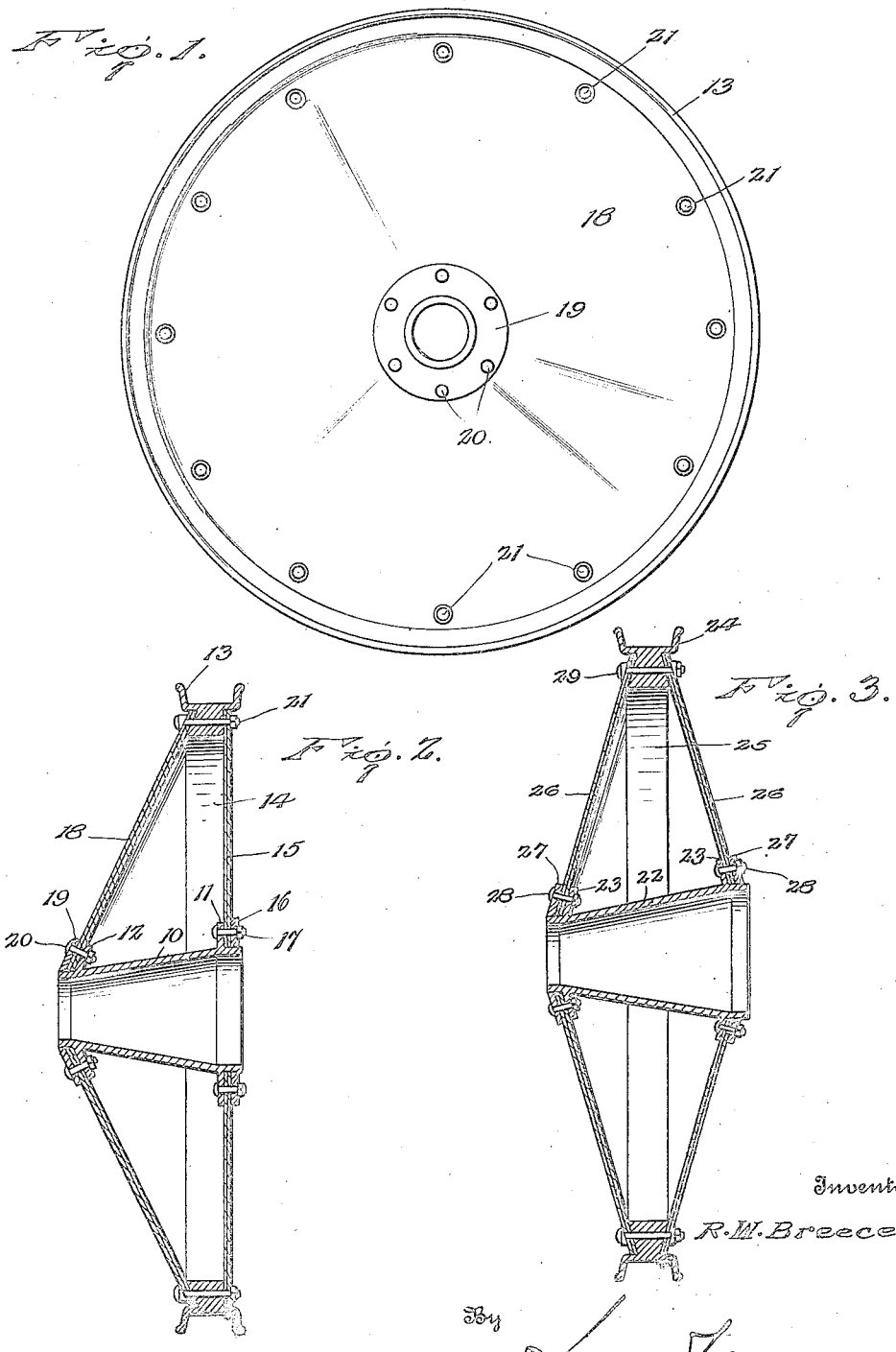

1,446,543

UNITED STATES PATENT OFFICE.

ROY W. BREECE, OF ARKANSAS CITY, ARKANSAS.

WHEEL.

Application filed July 6, 1921. Serial No. 482,796.

*To all whom it may concern:*

Be it known that I, ROY W. BREECE, citizen of the United States, residing at Arkansas City, in the county of Desha and State of Arkansas, have invented certain new and useful Improvements in Wheels, of which the following is a specification.

This invention relates to an improved motor vehicle wheel and has as one of its principal objects to provide a wheel embodying laminated wooden discs in the structure thereof.

A further object of the invention is to provide a wheel wherein, in the preferred embodiment of the invention, one of the discs will be dished or cone shaped while the other disc employed will be flat.

And the invention has as a still further object to provide a wheel which will be strong and durable and which may be produced at feasible cost.

Other and incidental objects will appear hereinafter.

In the drawing:

Figure 1 is a side elevation of my improved wheel,

Figure 2 is a vertical sectional view taken medially through the wheel, and

Figure 3 is a vertical section showing a slightly different embodiment of the invention.

In carrying the invention into effect, I employ a preferably metal hub 10 which is tapered toward its outer end and formed on said hub near the inner end thereof is a radial annular flange 11. Near its outer end, the hub is provided with an inclined annular flange 12 slanting in the direction of the flange 11. In conjunction with the hub, I employ a rim 13 designed to accommodate an ordinary pneumatic tire and formed on the rim at its inner side is an inner rim 14. At one side, this rim is provided with a flat radial face while at its opposite side it is formed with an inclined face beveled to conform to the inclination of the flange 12. Snugly fitting over the hub 10 at its inner end is a laminated wooden disc 15 which is flat and seats flat at its inner margin against the flange 11. The outer margin of the disc seats flat against the flat radial face of the rim 14 and fitting over the hub at its inner end is a hub ring 16 overlying the inner margin of the disc at its outer side and seating flat thereagainst. Extending through the disc, the flange 11 and said ring, is a plurality of bolts 17 rigidly connecting the disc with the hub. Snugly fitting over the hub at its outer end is a laminated wooden disc 18 which is dished or frusto-conical, the inner margin of the disc seating flat against the flange 12 while the outer margin thereof seats flat against the inclined face of the rim 14. Fitting over the hub is a hub ring 19 overlying the disc, and seating flat against the inner margin thereof and extending through said ring, the disc and the flange 12 is a plurality of bolts 20 rigidly connecting the disc with the hub. Extending transversely through the felly 14 and through the outer margins of the discs 15 and 18 is a plurality of circumferentially spaced bolts 21 rigidly connecting the rim with the discs. Thus, as will be seen, the discs will rigidly support the rim in concentric relation to the hub and by employing one flat disc in conjunction with a frusto-conical disc, the rim is supported in a plane touching the plane of the inner end of the hub.

In Figure 3 of the drawings, I have illustrated a slightly different embodiment of the invention wherein a hub 22 is employed, and formed on the hub near its ends are inclined annular flanges 23. The rim 24, which corresponds to the rim 13 of the preferred construction, is provided with an inner rim 25 having oppositely inclined side faces corresponding to the inclination of the flanges 23 and fitting over the ends of the hub are laminated frusto-conical wooden discs 26 which are oppositely dished and at their inner margins seat flat against the flanges 23 while the outer margins of said discs seat flat against the inclined faces of the rim. Fitting over the hub at its ends are hub rings 27 through which are engaged bolts 28 extending through the discs and through the flanges 23, rigidly connecting the discs with the hub, while through the outer margins of the discs are engaged bolts 29 extending through the rim 25 and rigidly connecting the rim with the discs. As will be seen, this embodiment of the invention provides an arrangement wherein, instead of employing one flat disc and one frusto-conical disc, as in the preferred construction, both of the discs are frusto-conical while the rim is supported in a plane lying substantially midway between the ends of the hub.

Having thus described the invention, what is claimed as new is:

A wheel including a hub having annular flanges near but spaced from both its ends, a rim surrounding the hub and having outwardly converging flat side faces alined with the respective flanges on the hub, laminated wooden discs extending between the hub and the rim and seating flat at their inner margins against the respective flanges and seating flat at their outer margins against the flat side faces of the rim, the inner marginal edges of the discs abutting the outer circumference of the hub and the outer marginal edges of the discs abutting annular circumferential shoulders of the rim, securing bolts inserted through the rim and the outer marginal portions of the discs, rings fitted over the ends of the hub against the outer sides of the discs, and fastening bolts inserted through the inner marginal portions of the discs and the said rings and the flanges on the hub.

In testimony whereof I affix my signature.

ROY W. BREECE. [L. S.]